United States Patent [19]

Duval

[11] Patent Number: 4,709,233

[45] Date of Patent: Nov. 24, 1987

[54] SINGLE LINE PAIR POWER CONTROL SYSTEM WITH MULTI-STATION CAPABILITY

[76] Inventor: David R. Duval, 1523 Plaza Del Amo, #6, Torrance, Calif. 90501

[21] Appl. No.: 498,645

[22] Filed: May 27, 1983

[51] Int. Cl.$^4$ ............................................. H04Q 1/00
[52] U.S. Cl. .......................... 340/825.18; 340/825.57; 307/542.1
[58] Field of Search ............... 361/187, 188, 245, 246, 361/166, 189-194, 56; 340/825.18, 825.57, 825.59, 825.06, 825.09, 825.17; 307/138, 359, 494, 290, 495, 236, 603, 141.8, 289, 157, 272 R, 11, 132 E, 138, 247 A; 315/318, 320, 321; 330/78, 282; 318/51, 53, 54, 65, 256, 280, 305, 101-103, 568

[56] References Cited

U.S. PATENT DOCUMENTS

| | | |
|---|---|---|
| 2,017,902 | 2/1938 | Oliver . |
| 2,788,517 | 4/1957 | Smoot et al. . |
| 2,820,157 | 1/1958 | Rieke ................................... 361/246 |
| 3,189,883 | 6/1965 | Lucas et al. ......................... 340/515 |
| 3,611,362 | 10/1971 | Scott .................................... 340/513 |
| 3,619,667 | 11/1971 | Gerlach ........................... 307/289 X |
| 3,786,314 | 1/1974 | Misch .................................. 361/187 |
| 4,017,832 | 4/1977 | Gilbert . |
| 4,034,168 | 6/1977 | Brown ................................. 361/246 |
| 4,086,568 | 4/1978 | Watts et al. . |
| 4,131,839 | 12/1978 | Springer . |
| 4,136,333 | 1/1979 | Sumida et al. . |
| 4,174,064 | 11/1979 | Pratt . |
| 4,198,579 | 4/1980 | Ebihara et al. ................. 307/247 A |
| 4,349,076 | 9/1982 | Oldendorf et al. ............. 307/247 A |
| 4,360,850 | 11/1982 | Howard et al. ....................... 361/56 |
| 4,410,808 | 10/1983 | Woodhouse ....................... 361/166 |

OTHER PUBLICATIONS

Hill et al, "Switching Theory and Logical Design", John Wiley and Sons, New York, 1974, pp. 71–77.

*Primary Examiner*—Ulysses Weldon
*Attorney, Agent, or Firm*—Bruce A. Jagger; Natan Epstein

[57] ABSTRACT

A single line pair power control system is disclosed and consists of a reflex module supplying direct current of a first or a second polarity to the control line pair. The polarity of the reflex module reverses in response to a drop in the voltage between the control lines. One or more command modules may be connected between the control lines for short circuiting the two lines to thereby cause polarity reversal of the reflex module. One or more power control relays may be connected to the control lines, such that the relay switch ON for one polarity state of the control lines and are switched off for the opposite polarity of the control lines, thereby controlling power to a load. Also disclosed are an extender module for extending the length of the control lines beyond the length that can be driven by the reflex module, and override circuits for disabling the operation of the command modules, and a special interface which allows control of the reflex module through logic level signals.

55 Claims, 8 Drawing Figures

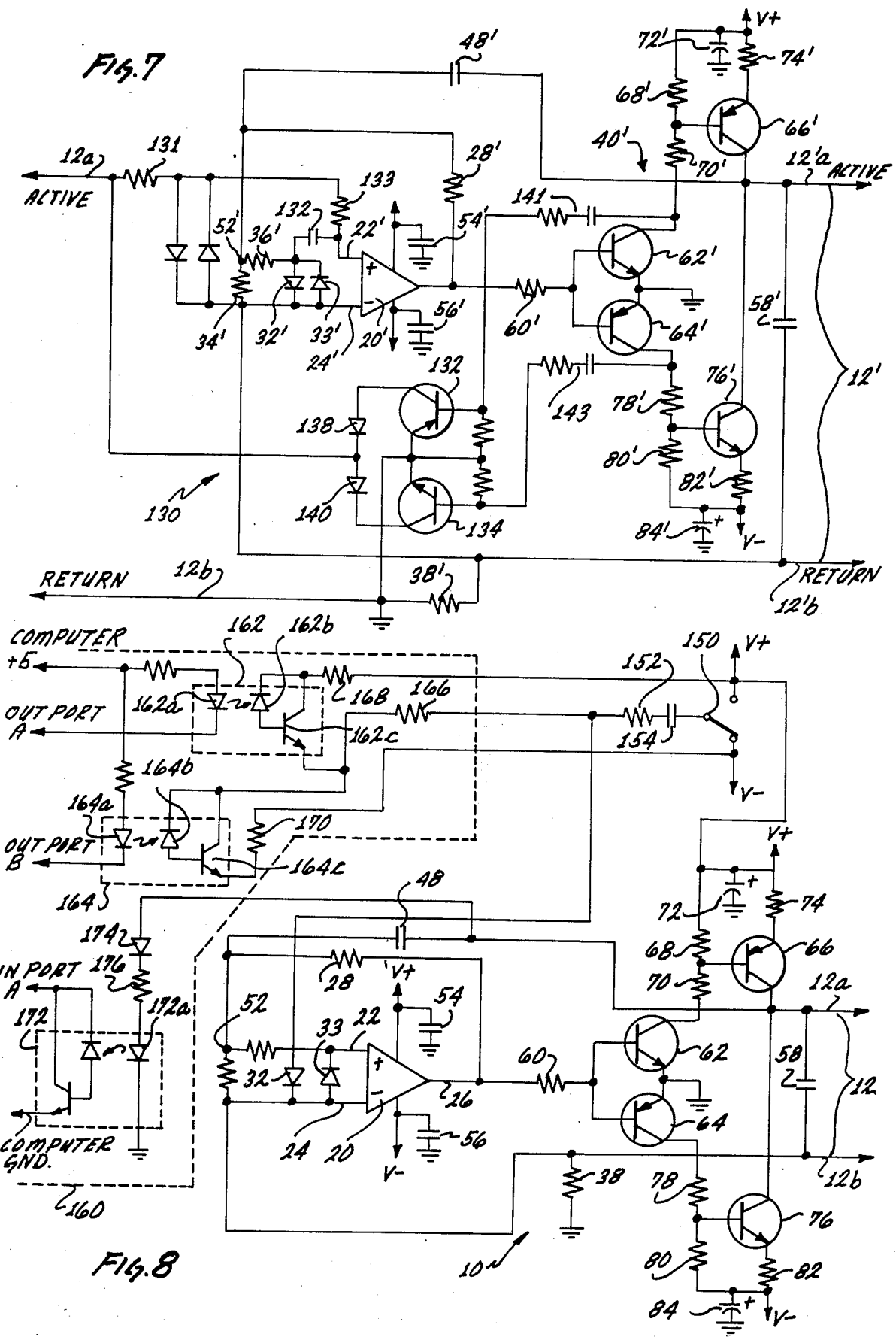

SINGLE LINE PAIR POWER CONTROL SYSTEM WITH MULTI-STATION CAPABILITY

BACKGROUND OF THE INVENTION

1. Field of the Invention

This invention relates to electrical control systems and more particularly to a control system in which a plurality of geographically distributed command stations are interconnected by a single pair of conductors. The command stations drive power control delays in response to polarity reversal of the line pair. Each of the command stations is capable of controlling the polarity status of the line pair, of driving a relay for controlling power to an electrical load, and may include means for monitoring the polarity status of the line pair.

2. Prior Art

Various systems suitable for controlling power to an electrical load from one or more remote command stations are known, as exemplified by the following patents:

| U.S. Pat. No. | Patentee Name | Issue Date |
| --- | --- | --- |
| 2,788,517 | W. L. Smoot et al | April 9, 1957 |
| 4,017,832 | D. E. Gilbert | April 12, 1977 |
| 4,136,333 | Sumida et al | January 23, 1979 |
| 4,131,839 | B. R. Springer | December 26, 1978 |
| 4,174,064 | Pratt, Jr. | November 13, 1979 |
| 4,086,568 | Watts, Jr. et al | April 25, 1978 |
| 2,107,902 | J. H. Oliver | February 8, 1938 |

The Smoot system differs from the present invention in that each of the remote control units of Smoot as well as the power relay circuit require separate power supplies. If the power supplies consist of batteries, a problem of reliability is created in that one or more of the control or power relay units may be disabled unexpectedly if its particular battery is exhausted. If, instead, each of the units is connected to an alternating current outlet for reliable power, the expense and complexity of the system is vastly increased since a separate transformer circuit will be necessary for each unit in the system and wiring will have to be installed between each of the control units and an A.C. outlet. This substantially decreases the usefulness of the remote control system since the control unit will have to be located within a reasonable distance from available power outlets.

The system disclosed by Gilbert appears to be limited to a single command station connected to a single power control relay unit. No provision is made for installing an arbitrary number of control and monitoring units to suit the particular requirements of a given installation. Since the proper operation of the circuit is admittedly dependent on overall electrical circuit characteristics, it would further appear that modification of the circuits so as to accommodate different numbers of power control relay units or command units would be impractical. In addition, in cases where long runs of transmission lines are required between the control/monitoring unit and the power relay unit, the inherent resistance of such transmission line would affect the operating characteristics of the system.

Sumida et al discloses a control system in which multiplexed signals are transmitted through a single line pair to a number of relay control circuits. This system differs from the present invention in that it aims to provide independent control over a number of electrical devices. Thus, the control circuits are considerably more complex than those of the present invention and rely on digital techniques. The remaining patents cited above differ in various significant respects from the present invention.

A continuing need exists for a reliable, low cost, power control system which can be easily installed without need for costly electrical conduits and is flexible enough to meet the requirements of a large variety of residential as well as industrial applications.

SUMMARY OF THE INVENTION

The control system of this invention provides a distributed control capability in which control over the state of one or more relays or equivalent switching devices can be exercised by means of passive control modules connected to the line pair at any number of locations which may be widely separated. A reflex module drives the signal line pair and supplies all power required by the relays and command modules. In the controlled system of this invention a reflex module is connected to a pair of electrically conductive control lines. The reflex module maintains the control line pair in a given electrical state. The electrical state of the control lines can be changed to another electrical state in response to a stimulus induced by a command module connected at any point across the two conductors of the control line pair. The stimulus provided by the control module may be a momentary change in the impedance between the conductors of the control line pair. The change of the control line pair from one electrical state to another electrical state can be used to control relays or other switching devices between an ON condition and an OFF condition. In a presently preferred embodiment, the electrical characteristic of the control lines which changes in response to the command module stimulus is the polarity of the two conductors of the control line pair. The stimulus provided by the command module is a low impedance path momentarily connected across the control line pair which causes a reversal by the reflex module of the polarity state of the control line pair conductors. For example, a lamp, a motor or other electrical load can be controlled through a relay connected to a control line pair. The line pair can be run through the particular premises and command modules connected across the line pair at as many arbitrarily spaced points along the line pair as is desirable. The lamp or motor can be turned on and off conveniently from whichever command module is nearest to the operator's location at a particular time. A flexible, geographically distributed control capability can thus be obtained at low cost simply by running an inexpensive, safe, low voltage line pair which can be installed without use of insulating conduits or elaborate safety precautions. The command modules of this invention are simple and inexpensive, and advantageously replace conventional three way high voltage switching arrangements which require costly high voltage wiring interconnecting multiple power switch locations, for example, where it is desired to install two separate switches for controlling a single light.

In the alternative, several loads such as several banks of lights which may be widely separated can be controlled simultaneously from a single command module. Each bank of controlled lights, for example, may be controlled through a local relay which is driven by the low voltage control line pair. In one electrical condition of the control line pair, all of the relays are switched on to power the several light banks, and in another condition the relays are switched off to turn off all of the light banks simultaneously. Although each relay is normally associated with a command module installed at a convenient location and connected across the line pair, the relays can also be connected directly to the line pair. The electrical state of the line pair can be controlled from any one of the command modules so that all of the light banks can be controlled simultaneously from a single command location without necessity of running high voltage wiring from a central switch location to the various light banks. Instead, each of the light banks may be connected directly to the nearest power A.C. source through a power control relay and the various relays may be interconnected and simultaneously controlled by the low voltage line pair. If desired, of course, more than one command module may be provided so that the several banks of lights may be controlled from any one of several locations.

Unlike previously known power control systems, the command module of the present invention do not require connection to any power source. All power required for driving the power control relays and for indicator lamps is supplied by the reflex module through the control line pair. It is therefore easy to add the power control system of this invention without modifying in any way existing electrical systems.

In a presently preferred embodiment, the power control and monitoring system of this invention comprises a reflex module which supplies a direct current of a first or a second polarity to a pair of control lines and a circuit connected for reversing the polarity of the power supply driving the control lines in response to a sudden drop in the voltage between the two conductors of the control line pair. One or more command modules actuatable by an operator may be connected for providing a momentary low impedance connection between the control lines so that the voltage between the lines collapses to thereby cause polarity reversal of the reflex module.

More particularly, the reflex module comprises an operational amplifier which has a noninverting input, an inverting input, and an output connected for driving a power amplifier. The power amplifier is connected for driving the control line pair and one of the control lines is capacitively coupled to one of the operational amplifier inputs. A voltage divider network is connected for keeping the capacitively coupled input at a first voltage relative to system ground and the other input of the operational amplifier at a second, smaller voltage relative to ground. If the voltage across the power amplifier output falls rapidly in response to a sudden current demand imposed on the line pair this zero going pulse is capacitively coupled to the operational amplifier inputs and if this voltage drop exceeds the steady state voltage between the two inputs of the operational amplifier, the coupled input is brought to a lower voltage than the other operational amplifier input, reversing the polarities of the two inputs thereby causing the output of the operational amplifier to reverse polarity. The capacitive coupling is such that only a relatively fast voltage drop across the control line pair will induce polarity reversal of the reflex module, and the reflex module does not respond to continuous currents drawn from the control line pair. Thus, to stimulate polarity reversal of the reflex module a low impedance connection must be switched quietly across the control line pair in order to induce a proper voltage drop. The voltage drop must therefore be both fast enough and of sufficient magnitude to cause the reflex response. This polarity reversal is reflected at the output of the power amplifier thus reversing the polarity of the control line pair. The reflex module may be described as a flip-flop circuit whose output is also its input.

In a basic embodiment each command module may be a normally open momentary contact switch connected across the control line pair such that when the switch is closed, a low impedance path or actual short circuit is created between the two conductors of the control line pair and as a result a sudden current surge is drawn from the output of the reflex module. In a presently preferred embodiment each command module comprises a control switch arrangement for connecting the control lines to each other, a current limiting circuit for drawing a limited, continuous current from the control line pair when the control line pair is in a selected polarity state (the "ON" polarity state) to drive the inputs of a power control relay, and indicator means such as light emitting diodes connected for indicating the current polarity status of the control line pair. For the opposite "OFF" polarity state of the control line pair the current limiter does not conduct and the power control relay turns off.

The reflex module may be further provided with an override circuit for locking the control line pair in a given polarity state which cannot be altered by actuation of any of the command modules. The reflex module can also be operated by means of a special interface disclosed herein which can interconnect the reflex module to a controller device such as a digital computer.

Also disclosed is an extender module which may be connected to the control lines for extending the length of the control line pair. The length of the control line pair that can be directly driven by the reflex module is limited by various factors including the electrical resistance of the pair of wires and the voltage and current output of the reflex module. In order to extend the length of the control line pair, an extender module is connected to the end of the primary line pair driven by the reflex module and a secondary length of control lines is connected to the output of the extender module. The total length of the control line pair may be extended to any desired length by insertion of additional extender modules at appropriate intervals. Each extender module is similar to the reflex module in that it is capable of delivering current to the control line pair connected to its output and to reverse the polarity of the control lines when fast voltage drop is induced between the two output lines. In addition, however, the extender module is provided with circuitry for creating a momentary low impedance connection across the primary control line pair so as to stimulate polarity reversal of the reflex module or another preceding extender module. Thus, regardless of the number of extender modules in a length of control line pair, a low impedance connection between the two conductors at any point of the control line pair causes a reversal of polarity of all other reflex and extender modules in the system.

These and other characteristics of the present invention are better understood by reviewing the following figures, which are submitted for the purposes of illustration only and not limitation, wherein like elements are referenced by like numerals, in light of the detailed description of the preferred embodiments.

BRIEF DESCRIPTION OF THE DRAWINGS

FIG. 7 is a circuit diagram of an extender module.

FIG. 8 is a circuit diagram of a reflex module provided with an interface suitable for computer control of the system and capability for remote overriding of the command modules.

DETAILED DESCRIPTION OF THE PREFERRED EMBODIMENTS OF THE INVENTION

Figure 1:
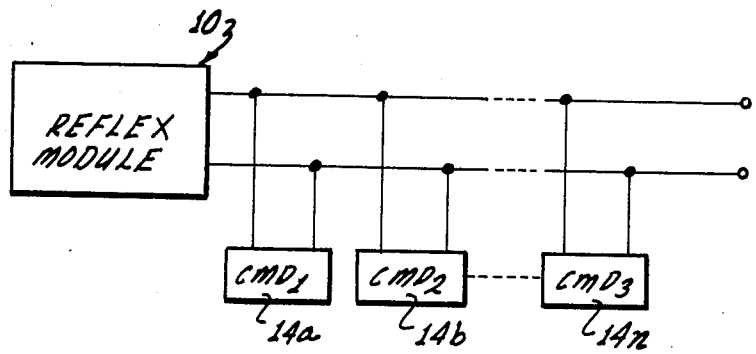
FIG. 1 is a block diagram of a power control system including a number of command modules connected to a line pair driven by a reflex module.
Figure 2:
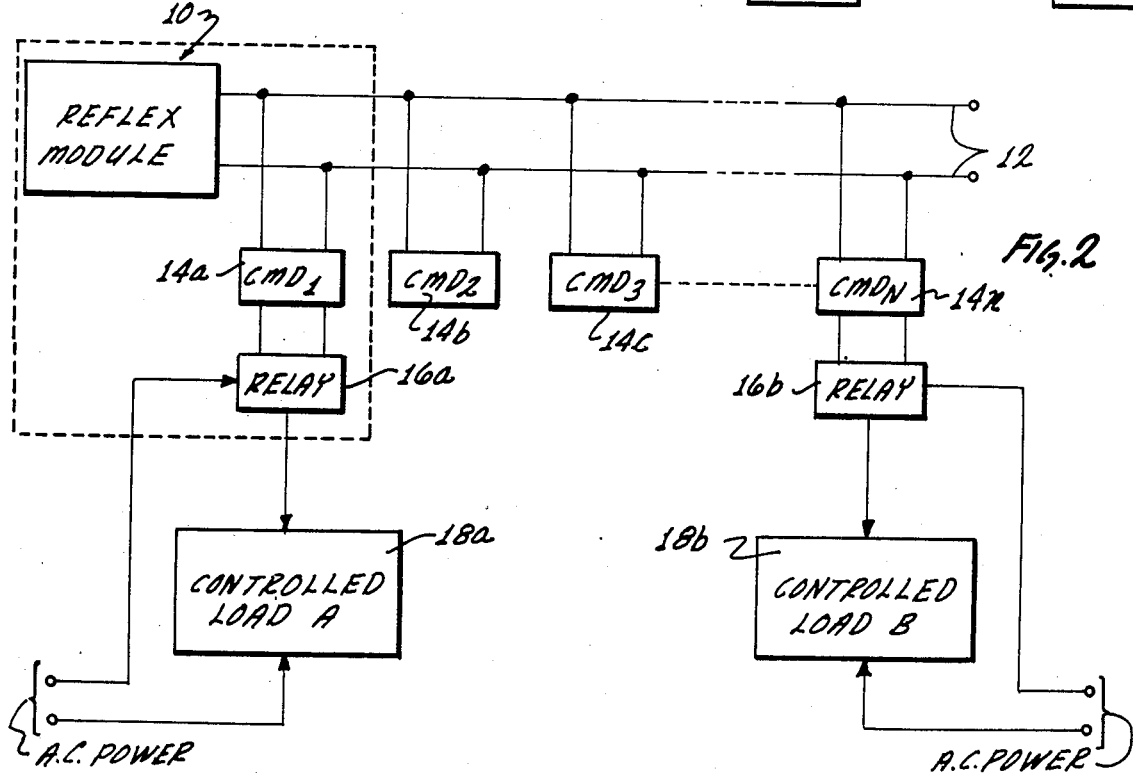
FIG. 2 illustrates in block diagram a typical installation of the control system of this invention wherein two loads connected to separate power sources can be controlled from any one of a number of command modules.

FIG. 1 illustrates in block diagram form the general configuration of a basic embodiment of the present invention. A reflex module 10 drives a control line pair 12. Command modules 14a, 14b..., 14n are connected between the two conductors of the control line pair at arbitrary points along their length. In a typical installation, such as shown in FIG. 2, a command module 14a is installed in immediate vicinity to reflex module 10 as indicated by the enclosure in dotted lines. The control line pair 12 may extend through the premises, e.g. a warehouse. The remaining command modules 14b, 14c through 14n may be installed at convenient locations throughout the premises and connected across the control line pair 12. A first control relay 16a is connected to the command module 14a and may be located within the enclosure which houses the reflex module 10 and command module 14a. The output of relay 16a controls the high voltage AC supply to a controlled load 18a. A second load 18b is similarly controlled by means of a second relay 16b which is driven by command module 14n. The two controlled loads 18a and 18b may be, for example, two banks of lights illuminating different areas of the premises. Both loads 18a and 18b are simultaneously switched ON or OFF from any of the command module locations distributed throughout the premises. The advantage of the control system illustrated in FIG. 2 is that the high voltage A.C. power to both loads A and B can be controlled from any of the command modules 14a-14n via the low voltage control line pair 12.

Figure 3:
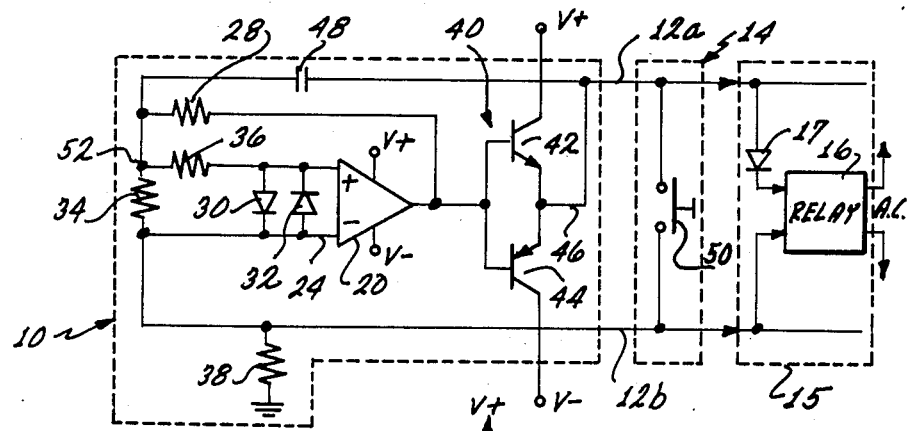
FIG. 3 is a simplified circuit diagram of a basic power control system comprising a reflex module a command module, and a power control relay.

The design and operation of the reflex module 10 is best understood by reference to FIG. 3 which for purposes of explanation shows a simplified circuit diagram of the novel two wire power control system. The reflex module 10 in the dotted line enclosure in FIG. 3 includes an operational amplifier 20 connected between the V+ and V− rails of a split voltage power supply. The operational amplifier 20 further includes a noninverting input 22, an inverting input 24, and an output 26.

A pair of voltage clamping diodes 30 and 32 are connected across the two inputs of the operational amplifier so as to limit the differential voltage between the two inputs to approximately 0.6 volts for either polarity of input voltage. A voltage divider network is connected to the inputs of the operational amplifier and includes resistor 34 connected across the operational amplifier inputs and resistor 36 connected in series with the noninverting input 22. The inverting input 24 and the lower end of the resistor 34 are connected to ground through resistor 38. The output 26 of the operational amplifier is connected to node 52 at the upper end of resistor 34 through resistor 28, thus establishing a positive feedback loop. The output 26 of the operational amplifier also drives a power amplifier stage 40 consisting of transistors 42 and 44 in a balanced push-pull configuration. The output 46 of the power amplifier 40 can be driven to the positive voltage rail V+ or to the negative voltage rail V− of the split power supply by the output of the operational amplifier 20. The control line pair 12 includes an active line 12a and a return line 12b. The active line is connected to the power amplifier output 46 and is also coupled through a capacitor 48 to node 52 at the upper end of resistor 34, and is also connected through resistor 36 to the noninverting input 22 of the operational amplifier. The return line 12b is connected to the inverting input 24 of the operational amplifier and is kept above ground by resistor 38.

In an initial equilibrium condition, feedback of the operational amplifier output to the noninverting input 22 through resistor 28 keeps the operational amplifier output 26 at or near one or the other voltage rails of the split power supply. Assuming, for example, that in an initial condition the op-amp output 26 is at V+, the output 46 of the power amplifier 40 will be similarly driven to or near V+. The active line 12a will thus be at approximately V+ while the return line 12b will be near ground. The values of resistors 28, 34, 36 and 38 are selected to form a voltage divider network such that node 52 is kept at a small voltage relative to ground which is a small fraction of the operational amplifier output voltage relative to ground. For example, if the power supply voltages are +15 volts and −15 volts, the node 52 may be kept at 1 volt relative to ground. The polarity of the voltage at node 52 will, of course, depend on the polarity of the operational amplifier output voltage. Due to the clamping diodes 30 and 32, the noninverting input 22 of the operational amplifier is at 0.6 volts (positive or negative) relative to the inverting input. The value of resistor 38 is selected to be small relative to resistors 28 and 34 so that the inverting input 24 is very near ground e.g. 0.1 volts positive or negative.

A command module 14, shown in FIG. 3 in simplified form as consisting of a normally open momentary contact switch 50, is connected between the active control line 12a and the return line 12b. When the switch 50 is momentarily closed, a low impedance path is established across the two lines 12a and 12b, thus drawing a current surge from the output 46 of amplifier 40. The voltage across the parallel lines 12a and 12b quickly drops from a value near V+ or V− towards a value near ground. This zero going voltage pulse is coupled through capacitor 48 to node 52 of the voltage divider network at the operational amplifier input. The node 52, which was previously at an equilibrium voltage equal to a fraction of the operational amplifier output voltage, is suddenly driven by this relatively large capacitively coupled zero going pulse towards a voltage of opposite polarity from its previous equilibrium polarity and an absolute value considerably greater than its equilibrium voltage. For example, let the node 52 be at an equilibrium voltage of +1 V relative to the noninverting input 24. The short circuit across the control line pair created by actuation of switch 50 produces a falling voltage pulse from e.g. +15 to 0. The results is that the node 52 connected to the noninverting input 22 of the operational amplifier is suddenly driven to a polarity opposite that of the inverting input 24 of the operational amplifier. The voltage pulse coupled by capacitor 48 is always zero going regardless of the polarity state of the control lines.

This reversal of polarities at the operational amplifier inputs causes the operational amplifier output 26 follow the polarity of its noninverting input and to be driven to the opposite polarity rail of the split voltage power supply. If initially the amplifier output 26 was near V+, the actuation of the command module switch 50 causes the amplifier output 26 to reverse polarity to near V−. This new negative output voltage is fed back through resistor 28 to the noninverting input 22 of the operational amplifier which thereafter holds the amplifier 20 in its condition of reversed output polarity. The polarity reversal of the operational amplifier output 26 drives the power amplifier 40 causing the control lines 12a and 12b to also reverse polarities, such that line 12a passes from a positive voltage to a negative voltage relative to line 12b. This new polarity state is a stable condition for the circuit and will not reverse until the switch 50 of the command module 14 is again momentarily depressed.

The current available from the control lines 12a and 12b, within the output capacity of the power amplifier 40, can be used for switching one or more control relays or equivalent power control devices for controlling lights, appliances, or any kind of electrical load.

In a basic embodiment of the invention, a power control relay 16 may be driven by connecting its inputs across the control lines 12a, 12b in series with a diode 17 as illustrated in FIG. 3 in the dotted line enclosure 15. For the given orientation of diode 17 the relay 16 will turn on when control line 12a is positive relative to return line 12b, and will turn off for the opposite polarity of lines 12a, 12b.

Figure 4:
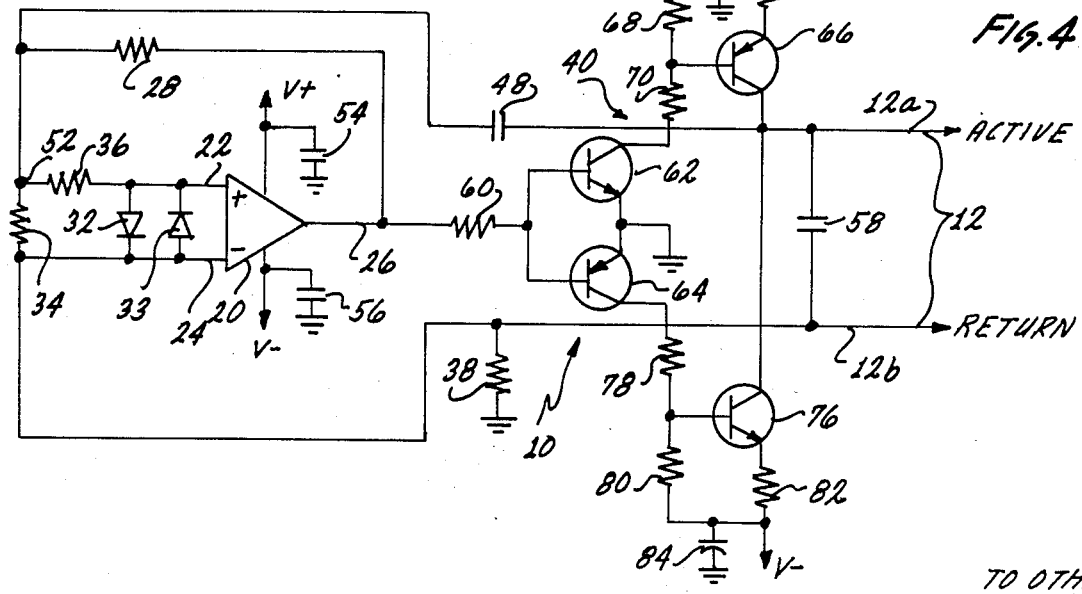
FIG. 4 is a circuit diagram of a reflex module.

FIG. 4 illustrates in greater detail a circuit diagram for a reflex module 10. In addition to the components already described in connection with FIG. 3, the circuit diagram of FIG. 4 includes bypass capacitors 54 and 56 connected between each of the power supply terminals of the operational amplifier and ground and a filter capacitor 58 connected between the active control line 12a and the return control line 12b. The power amplifier stage 40 is a complimentary symmetry push-pull amplifier driven through series input resistor 60 connected to the bases of push-pull driver transistors 62 and 64. The npn driver transistor 62 has its collector connected for driving the base of pnp output transistor 66 through a biasing network that includes resistors 68 and 70, bypass capacitor 72 and emitter resistor 74. The collector of the pnp driver transistor 64 is connected for driving the base of the npn output transistor 76 through a biasing network which includes resistors 78, 80, 82 and bypass capacitor 84. When the output 26 of the operational amplifier is positive, the npn driver transistor 62 conducts and switches on output transistor 66 the active control line is then connected through resistor 74 to the positive supply rail V+ so that line 12a is positive relative to return line 12b. Conversely if the output 26 of the operational amplifier swings to the negative supply rail, pnp driver transistor 64 conducts and switches on output transistor 76. This connects the active control line 12a to V− through resistor 82, so that line 12a becomes negative relative to line 12b. Each of the output transistor circuits is configured as a current regulator circuit so as to limit the current output of the amplifier 40 to a safe value for either polarity condition of the reflex module. As an increasing current is drawn from the collectors of the output transistors, the voltage drop across the emitter resistors 74, 82 increases until it exceeds the voltage drop across the emitter-base resistors 68, 80 respectively. The base-emitter junction of the output transistors then becomes decreasingly biased, limiting the current output of transistors 66, 82. The active control line 12a is directly connected to the collectors of both output transistors 66 and 76 and can therefore assume either a positive or a negative polarity relative to the return line 12b depending on which of the two power transistors is conducting at a particular moment. The return line 12b is connected to the inverting input 24 of the operational amplifier and is kept at a small voltage above ground by resistor 38. The value of resistor 38 is preferably equal to that of resistors 74 and 82 in the emitter circuits of the output transistors in order to maintain the symmetry of the circuit. The object of circuit symmetry is to maximize immunity of the circuit to common mode noise picked up by the control line pair, to allow use of long runs of inexpensive unshielded two conductor cable for the control line pair 12.

Figure 5:
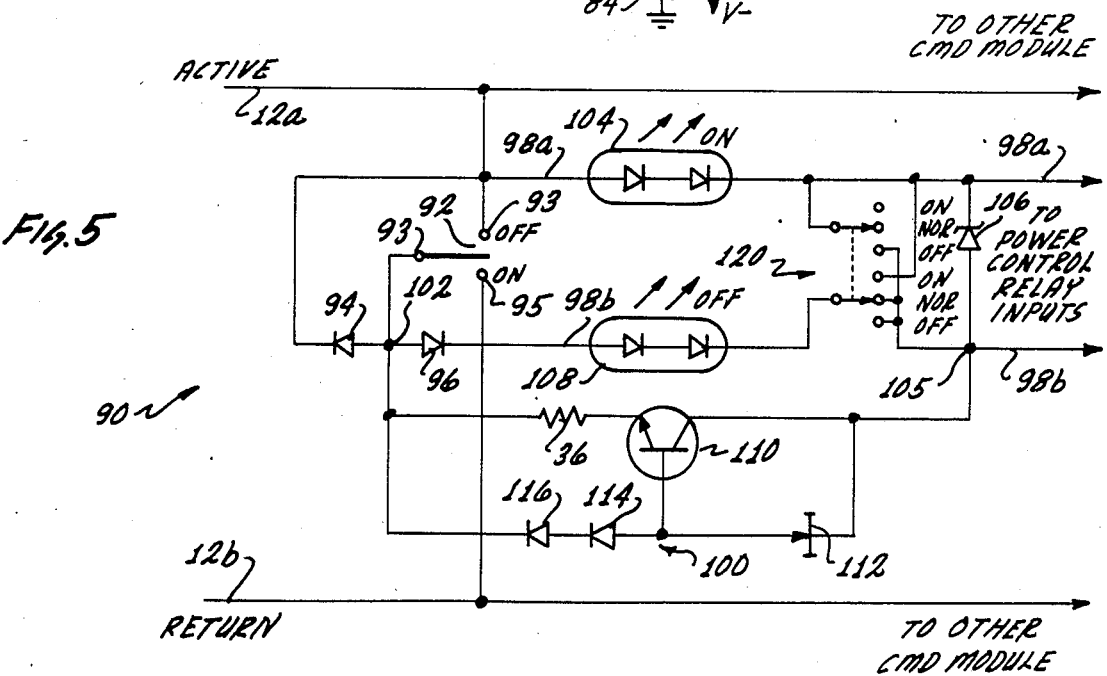
FIG. 5 is a circuit diagram of a command module provided with monitoring and relay driving capabilities.

FIG. 5 illustrates a presently preferred embodiment of a command module 90. In the interest of clarity the operation of the circuit will be first explained with the switch 120 in the position shown in FIG. 5. The function of switch 120 is explained below.

The command module of FIG. 5 performs three distinct functions which have been combined in a single circuit to maximize efficiency and economy. These functions are: control of the polarity status of the reflex module, local indication or monitoring of the polarity status of the control line pair, and driving the inputs of a power control relay. It is within the scope of this invention to construct alternate modules which perform only one or two of these functions, as exemplified by the basic modules 14 and 15 in FIG. 3.

The polarity state of the reflex module is controlled by a single pole double throw normally open momentary contact control switch 92 which has terminals 93, 95 connected to the control lines 12a, 12b respectively. A pair of back-to-back diodes 94, 96 are connected between the two switch terminals 93, 95. The moving contact 93 of the control switch is connected to the anodes of the back-to-back diodes 94, 96 at node 102. Assuming an initial positive polarity of the active control line 12a relative to the return line 12b, the control lines 12a, 12b can only be shorted by moving the contact 93 to the OFF position in FIG. 5. For the opposite polarity condition, the control lines 12a, 12b can only be shorted by moving switch 92 to the ON position. The back to back diodes thus provide an exclusivity of function in the operation of the control switch 92 and define the ON and OFF states of the system.

The current regulator circuit 100 has a positive terminal 102 and a negative terminal at node 105, and comprises transistor 110 which has its collector connected to the anode of zener 106 and its emitter connected through resistor 36 to node 102 between the anodes of the back-to-back diodes 94, 96. A current regulator diode 112 is connected between the collector and base of transistor 110 and two diodes 114 and 116 are connected in series between the base and node 102. The current regulator diode is selected to maintain a constant current flow through the diodes 114, 116, thus maintaining a steady 1.2 volt reference drop across the two series diodes between the base and node 102. The emitter resistor 36 is selected to have a value such that when the current through resistor 36 and transistor 110 attempts to exceed a predetermined value, the voltage drop across the resistor 36 will exceed the reference voltage drop across the two diodes 114, 116, causing the base-emitter junction of transistor 110 to become decreasingly biased thereby maintaining the predetermined current flow through the transistor. Other current regulator circuits may be readily substituted for the one shown in FIG. 5.

For the orientation of the diodes illustrated in FIG. 5, the terminal 93 of control switch 92 connected to the active control line 12a is the OFF terminal and the terminal 95 connected to the return line 12b is the ON terminal. For a positive polarity of active control line 12a relative to return line 12b, current flows from the active control line 12a through LED 104, causing the zener 106 to break down and conduct. The current path then continues through the current regulator circuit 100, to node 102 and through diode 96 to the return line 12b. The current through the command module 90 is limited by the current regulator circuit to a value sufficient for driving the power control relay and powering the L.E.D. indicators, e.g. 20 milliamperes so as to protect the reflex module against overload and to allow simultaneous operation of several command modules without exceeding the maximum current output of the reflex module. A power control relay (not shown in FIG. 5) may be driven by connecting its input across zener diode 106, as indicated by relay drive lines 98a, 98b. The ON condition of the command module 90 thus requires that zener 106 conduct. This occurs when the active control line 12a is positive relative to return line 12b. In the ON condition LED 104 conducts and therefore emits light to provide visual indication of the state of the command module.

Assuming an initial ON condition for the module 90, if the moving contact 93 of the control switch 92 is momentarily connected to its OFF terminal 93 and then released to its normal open position shown in FIG. 5, during the brief contact the two control lines 12a and 12b are shorted together causing fast drop in the voltage between lines 12a and 12b. In response, the reflex module changes polarities at its output in a manner that has been described, such that the active control line 12a is made negative relative to the return line 12b. For this new polarity condition of the control line 12a, 12b, a new current path is established through the command module 90 flowing from the active control line 12a through diode 94 into node 102, through the current regular circuit 100 to node 105, then through the OFF indicator LED 108 and finally to the return line 12b. For this polarity condition of the control lines Zener diode 106 does not conduct and no power is available at the relay drive lines 98a and 98b. In the OFF condition LED 108 conducts, visibly indicating the OFF condition of the command module.

Polarity reversal of the control line pair 12, even though caused by actuation of the control switch 92 of a particular command module 90, will cause any other command modules connected between the same pair of control lines 12a and 12b to indicate the new polarity state of the system. Similarly, all relays driven by other command modules connected to the same control line pair will be simultaneously switched on or off.

Node 102 is always the negative end of the current regulator while node 105 represents the positive end of the regulator circuit. The collector of transistor 110 is connected to the cathode of LED 108 and the relay input line 98b is taken from that connection. The zener diode 106 is necessary to cause the indicator LEDs 104 to light up when no relay is connected. If LEDs 104 and 108 are eliminated, zener 106 could also be eliminated from the circuit and the relay inputs connected directly in its place. The command module 90 may drive an opto-coupled relay, such as are presently sold by various manufacturers, and which typically are driven by an input of 3.6 volts at a drive current of 15 milliamperes. The current limiting circuit 100 may be designed to limit the current drawn by the command module to approximately 20 milliamperes, thus assuring ample current for driving such a relay through lines 98a and 98b. Opto-coupled relays are available in a variety of output voltage and current ratings which may be selected to suit the particular load to be controlled.

The command module 90 in FIG. 5 may be further provided with an optical local override switch 120, shown here by way of example as a two-pole triple throw switch. The cathode of the ON LED 104 is connected to the upper moving contact and the cathode of the OFF LED 108 is connected to the lower moving contact of switch 120. The switch 120 includes an upper bank of three terminals labeled ON, NORMAL, and OFF and a lower bank of three similarly labeled terminals as illustrated in FIG. 5. The lowermost or OFF terminal of the upper bank is connected to the collector of current regulator transistor 110. The collector of transistor 110 is connected to the middle or terminal of the lowermost switch bank as well as to the anode of zener 106. The upper or ON terminal of the lower switch bank is connected to the cathode of zener 106 as well as to the cathode of on LED 104 and relay input line 98a. As connected, override switch 120 can assume three positions namely up, center and down depending on the connection between each of the moving contacts and the three terminals of the respective switch banks. In the center position of switch 120, the command module operates in a normal manner as has been described and is responsive to actuation of command switch 92. If the switch 120 is moved to the up position, zener diode 106 is included in the current path for either polarity condition of the control lines 12a and 12b. This means that the relay inputs will be energized regardless of the polarity of the reflex module outputs and consequently this switch position in effect locks the command module in an ON condition. Operation of the command switch 92 will cause the reflex module to change polarity states in a normal manner, but this change of polarity of the control lines will have no effect on the control relay driven from lines 98a, 98b. The bottom terminal of the lower switch bank is also connected to the collector of current regulator transistor 110. The operation of the indicator LEDs 104 and 108 is not affected by the override switch 120, and will thus respond to changes in polarity of the control lines 12a and 12b in a normal fashion. If override switch 120 is moved to the down position, the cathode of both indicator LEDs 104 and 108 are connected to the collector of transistor 110 and the zener diode 106 is excluded from the circuit for either polarity state of the control lines, and no power is delivered to the relay inputs.

Override switch 120 only affects the status of the power control relay driven by the particular command module 90 in which the override switch 120 has been actuated. The remainder of the system including any other command modules and relays that may be connected across the same pair of control lines 12a and 12b are free to operate in a normal manner in response to actuation of the control switch 92 of such other command modules.

It will be appreciated that the diode complement of the command module 90 forms a full wave rectifier bridge circuit where the control lines 12a and 12b are the input to the bridge, and the current regulator circuit 100 between nodes 102 and 105 is the load of the bridge rectifier. The zener diode 106 is connected in series with indicator LED 104 in one leg of the bridge circuit, and the relay drive input is taken across the zener 106.

FIG. 7 illustrates an extender module 130 which is useful for installations having either very long control lines 12a and 12b or having a large number of command modules connected across a particular control line pair. For example, if the control line pair is excessively long, its inherent resistance will reduce the voltage available across the control lines at a point far removed from the output terminals of the reflex module to a level no longer sufficient to drive the control relays. Similarly if too many command modules are connected across the same control line pair, the aggregate current drain of the command modules may exceed the output capability of the reflex module. In either case, the problem may be overcome by use of an extension module such as illustrated in FIG. 7 which receives as an input a pair of primary control lines 12a, 12b driven by a reflex module such as that of FIG. 4 and drives a pair of secondary control lines 12a', 12b' as an output. The extender modules must be connected to a suitable source of power.

The extender module 130 has drive capabilities similar to those of the reflex module. In effect the extender module acts as an amplifier with a high impedance input connected to the primary control line pair, and a lower impedance output driving the secondary control line pair. Means are provided for momentarily creating a low impedance path across the primary control line pair at the input of the extender module in response to a change of polarities of the extender module output. This momentary low impedance load across the primary control lines provides the stimulus which causes the reflex module to also change polarities and thus follow the polarity of the extender module output. Conversely if the reflex module changes polarities, means are provided for causing the extender module to also change polarities at its output terminals. In this fashion the primary control lines and the secondary control lines always have the same polarity state.

Figure 6:
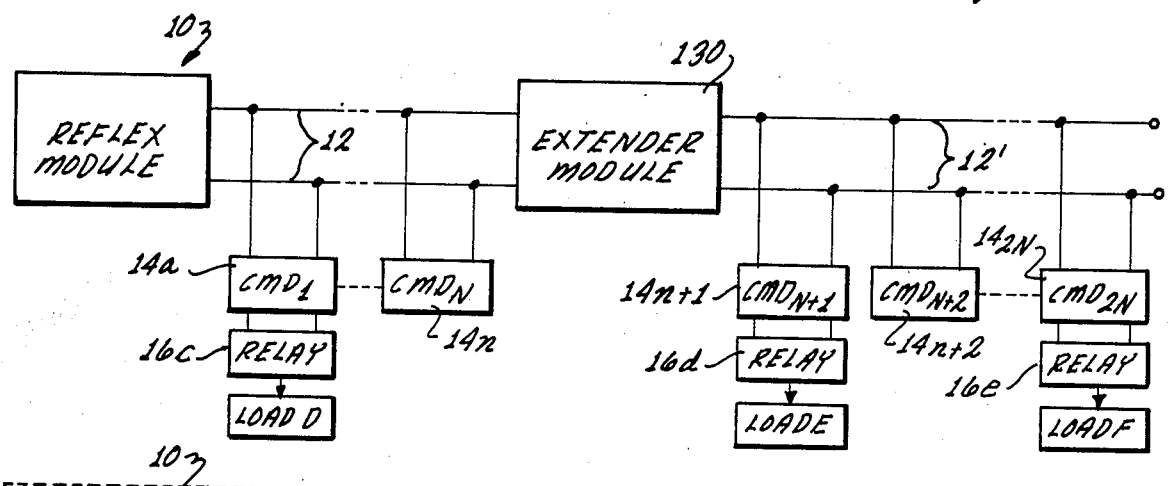
FIG. 6 shows a power control system extended by the addition of an extension module and additional command modules connected to the extended control line pair.

A typical control system configuration using an extender module 130 is shown in block diagram in FIG. 6. The reflex module 10 drives a primary control line pair 12 which terminates at the input of the extender module 130. A number N of command modules, determined by the drive capability of reflex module 10, may be connected across the primary control line pair 12. In the example of FIG. 6, command module 14a is connected for driving a power control relay 16a which controls power to a load D. The output of extender module 130 drives a secondary control line pair 12'. A similar number N of command modules $14_{n+1}$ through $14_{2N}$ may be connected across the secondary control line pair 12'. In the example shown, command module $14_{n+1}$ and $14_{2N}$ are shown connected to respective relays 16d and 16e, each of which controls power to a corresponding load E and F. Any command module connected across either the primary control line pair 12 or the secondary control line pair 12' is capable of switching the polarity state of both the reflex module 10 and the extender module 130. All command modules $14_a$–$14_{2N}$ in the system will then indicate the new polarity status of the control line pairs and turn on or off power to all the controlled loads D, E, and F through the corresponding control relays 16c, 16d, and 16e.

FIG. 7 shows with greater particularity a circuit diagram for an extender module 130. The extender module is based on a reflex module circuit similar to that shown in FIG. 4 and described above. The principal modifications include the coupling of the primary control line pair 12a, 12b to the inputs of the operational amplifier 20 and the provision of a complementary pair of transistors 132, 134 connected across the input of the extender module. The two transistors 132 and 134 are connected such that they place a momentary low impedance load across the primary control line pair 12 whenever the output 26 of the operational amplifier 20 switches polarities. This provides the stimulus necessary to cause the reflex module to reverse polarities of the primary control line pair.

Referring to FIG. 7, where primed numerals identify circuit elements equivalent to those found in the reflex module of FIG. 7, the primary active control line 12a is direct coupled to the noninverting input 22' of the operational amplifier 20' through resistors 131 and 133. Therefore, the equilibrium polarity status of the extender module output is determined only by the polarity of the primary control lines 12a and 12b which constitute the input to the extender module 130. Thus, if the primary reflex module 10 changes polarity states, this change will cause the operational amplifier 20' of the extender module 130 to also change states and ultimately cause the extended control lines 12'a to follow the polarity of the reflex module. However, if a command module connected across the secondary or extended control line pair 12' is actuated so as to provide a stimulus to the extender module by shorting together the secondary control lines 12'a, 12'b, this output pulse is coupled through capacitor 48' and capacitor 132 to the noninverting input 22' of the operational amplifier 20'. As was earlier explained in connection with the reflex module in FIG. 4, this capacitively coupled zero going pulse causes the operational amplifier output 26' to change polarities. This polarity change of the operational amplifier output is reinforced by feedback through resistor 28' such that a regenerative effect takes place during a brief period, e.g. approximately 4 milliseconds. The operational amplifier output 26' switches polarities during this brief interval regardless of the polarity of the primary control line pair 12a and 12b because the influence of the primary line pair 12 is outweighted while capacitor 132 is charging. The change in polarity of the operational amplifier output 26 also alters the condition of the driver stage of the power amplifier 45. Whichever one of driven transistors 62', 64' was conducting prior to the change in polarity of the operational amplifier output is now switched off, and the other one of driver transistors 62' and 64' is switched on. The collectors of the driver transistors 62' and 64' are connected through series resistance capacitance networks 141, 143 respectively to the bases of push/pull complementary pair of transistors 132 and 134. The emitters of transistors 132, 134 are connected to the primary return line 12b, while the collectors of the transistors are connected to the primary active line 12a and are isolated from each other by series diodes 138, 140. Thus, when the operational amplifier 20' changes states, whichever transistor 62' or 64' is switched on by this polarity change causes a pulse to be transmitted through the corresponding coupling R-C network 141, 143 to one of transistors 132, 134. The corresponding transistor switches on briefly for the duration of the pulse, for example, 100 microseconds which is determined by the values of the R-C coupling network, opening a low impedance current path between the primary active line 12a and the primary return line 12b. For example, if transistor 136 is switched on because driver transistor 62' was turned on due to a polarity swing of the operational amplifier output 26', current flows from the primary return line 12b into the emitter of transistor 134, from the collector of transistor 134 through diode 138 and then to primary active line 12a. If conversely it was driver transistor 64' which was turned on by the polarity switch at the operational amplifier output, transistor 136 is switched on as a result presenting a low impedance path from the primary active line 12a through diode 140 and from its emitter to the primary return line 12b. This brief low impedance path across the primary control lines 12a and 12b provides the necessary stimulus to the reflex module which causes the reflex module to change polarity states. The new polarity of the reflex module is direct coupled to the noninverting input 22' of the operational amplifier 20' by the primary control lines 12a, 12b, which determines the equilibrium polarity state of the operational amplifier 20' and consequently the polarity of the secondary control lines 12'a and 12'b.

To summarize this sequence of events, the actuation of a command module across the secondary or extended control lines 12'a, 12'b causes the extender module to change polarity states momentarily. This change is an intermediate step and is not a stable new condition of the extender module, because the long term polarity state of the extender module is dictated by the polarity status of the primary control lines 12a, 12b. However, this momentary reversal of the extender operational amplifier 20' polarity causes the transistors 132, 134 to induce a polarity reversal of the reflex module, which then causes a stable reversal of polarity state of the extender module, so that the primary control lines 12a and 12b follow the polarity of the secondary control lines 12'a and 12'b.

The extender module 130 includes a power amplifier stage 40' equivalent to power amplifier stage 40 of the reflux module in FIG. 4 and is thus capable of driving a number of command modules equal to that driven by the reflex module. Any number of such extender modules may be connected to obtain any desired total length of control line pair. Actuation of a command module anywhere in the chain of modules will cause all other command modules up and down the chain to change polarity states.

If for some reason the primary control lines 12a and 12b do not change states in response to the low impedance load placed across the primary control lines by the momentary switching of transistors 132 or 134, then the extender module will revert to its original polarity since the long term state of the operational amplifier 20' is controlled by the polarity of the primary control lines. Such failure to change states by the primary control lines could be due either to failure of the reflex module or of another preceding extender module connected to the input of the particular extender module 130, or by operation of an override system explained below, which prevents the reflex module from changing states.

The circuit of FIG. 8 illustrates a reflex module provided with a power-up preferred polarity selector feature and a control interface suitable for computer control of the reflex module.

The power-up polarity circuit includes switch 150 which is a single-pole double-throw switch for selectively connecting the noninverting input 22 of the operational amplifier 20 through a resistance capacitance network, consisting of resistor 152 and capacitor 154, to either the V+ or V− rail of the split power supply. When power is first applied to the system, the initial polarity status of the control line pair 12 will be determined by the position of the power-up preferred state switch 152. If the switch is connected to the positive rail of the power supply, then a positive pulse will be applied to the noninverting terminal 22 of the operational amplifier when power is first applied to the reflex module, causing the output of the operational amplifier to go positive and latch in that state due to feedback through resistor 28. The opposite result is obtained if the switch 150 is connected to the negative voltage rail of the system prior to applying power to the reflex module.

The reflex module of FIG. 8 is further provided with an optional control interface enclosed in dotted line and generally numbered 160. The interface allows the reflex module 10 to be controlled with logic level signals from a remote location by means such as a digital computer.

The interface 160 includes a pair of opto-couplers 162 and 164 which can be switched on by means of input control signals derived, for example, from two output ports A and B respectively of a digital computer which deliver five volt logic signals to the input diodes 162a and 164a respectively of the opto-couplers. When the input diodes are switched on they emit radiation which causes the output diodes 162b or 164b respectively to conduct, thus turning on the output transistor 162c or 164c of the respective opto-couplers. The output transistors connect the noninverting input 22 of the operational amplifier 20 to the positive and negative voltage rails of the split voltage power supply through current limiting resistors 166, 168 and 170. Depending on which of the opto-couplers 162, 164 is turned on, the noninverting input of the operational amplifier is direct coupled to the positive or negative voltage rails of the power supply forcing the output 26 of the operational amplifier 20 and thus the active control line 12a to follow the polarity of the noninverting input. A third opto-coupler 172 has its input connected to the active control line 12a through diode 174 and current limiting resistor 176. The input diode 172a of the opto-coupler is thus turned on when the control line 12a is positive and turned off for the reverse polarity condition of the control lines. By monitoring the output of the opto-coupler 172, as for example, through the input port A of a controlling digital computer it is possible to remotely monitor the condition of the reflex module and power control system and to verify response of the system to commands transmitted through the input opto-couplers 162 and 164.

If desired, a single-pole double-throw system override switch may be connected in a manner similar to that of power-up state select switch 150, but with the omission of capacitor 154. The noninverting input 22 of the operational amplifier may thus be DC coupled to one or the other voltage rails of the power supply so as to lock the power controlled system in a desired state. When so locked, the reflex module 10 is rendered nonresponsive to actuation of command modules connected across the control line pair 12.

It will be appreciated that the controlled system of this invention is useful not only for power control applications, but is equally adaptable to other switching applications, e.g., switching of audio signals, video signals etc . . . Further, relay pairs may be operated by the control line pair and connected such that one relay is switched on for a given polarity, while the other relay is switched on for the opposite polarity state of the line pair. It is also possible to connect two or more extender modules in parallel across a single control line pair such that one pair of control lines drives the inputs of more than one extender modules, as distinguished from a plurality of extender modules connected in series where a line pair drives the input of a single extender module, the output of which in turn drives the input of a subsequent extender module and so on.

It must be understood that many alterations and modifications may be made by those having ordinary skill in the art to the configuration and circuits of the present invention without departing from the spirt and scope of the invention. Therefore, the presently illustrated embodiments have been shown only by way of example and for the purpose of clarity and should not be taken to limit the scope of the following claims.

I claim:

1. A control system including a reflex circuit and a single pair of electrical conductors connected to and normally presenting a relatively high impedance load to said reflex circuit, said reflex circuit including means for supplying direct current voltage of a first or a second relative polarity to said control line pair, and means for reversing the relative polarity of said direct current voltage from one of said relative polarities to the other of said relative polarities in response to a momentary drop in the voltage difference between said conductor pair induced by switch means connected between said conductor pair for momentarily establishing a low-impedance path between said control lines, said reflex circuit maintaining said reversed relative polarity following removal of said momentary low impedance path, said conductor pair being switchable back and forth between said first and second relative polarities responsive to repeated actuation of said same switch means momentarily establishing said low impedance path.

2. The control system of claim 1 further comprising switch means connected between said single pair of electrical conductors and actuatable for momentarily establishing said low impedance path between said pair of control lines to thereby cause said drop in the voltage difference between said line pair and thereby reverse the relative polarity of said direct current voltage.

3. The control system of claim 2 further comprising one or more control relays switchable between an ON state and an OFF state responsive to relative polarity reversal of said control line pair for controlling power to a load.

4. The control system of claim 2 further comprising monitoring means connected to said control line pair indicative of the relative polarity state of said control line pair.

5. The control system of claim 1,
   wherein said means for supplying direct current voltage comprise amplifier means connected between a positive and a negative voltage supply rail and having an inverting input, a noninverting input and an output driving one of said control lines, the other of said control lines being referenced to system ground; and
   wherein said means for reversing relative polarities comprise means coupling said one control line to said inputs such that the relative polarity of said amplifier inputs is momentarily reversed in response to a sudden drop in the voltage difference between said pair of control lines thereby to reverse the polarity of said output relative to system ground, and feedback means connected between said output and said inputs for maintaining a reversed relative polarity state of said control line pair following such momentary reversal of the relative polarities of said amplifier inputs.

6. The control system of claim 5 wherein said coupling means comprise capacitive coupling means.

7. The control system of claim 5 wherein said feedback means comprise resistor means connected between said amplifier output and said noninverting amplifier input.

8. The control system of claim 1 wherein said means for supplying direct current voltage comprises:
   operational amplifier means having an inverting input, a noninverting input, an operational amplifier output, and feedback means connecting said operational amplifier output to one of said inputs; and
   power amplifier means driven by said operational amplifier output and having an output for delivering current to drive a control line pair;
   and wherein said means for reversing relative polarities comprise coupling means connecting the output of said power amplifier means to said noninverting input.

9. The control system of claim 8 wherein said power amplifier means further comprise current limiter means for limiting the current output to said driven control line pair thereby to facilitate the drop in voltage difference between said control lines in response to said momentary low impedance path.

10. The control system of claim 8 wherein said power amplifier output is symmetrical relative to system ground for either polarity state of said output thereby to maximize common mode noise rejection of said reflex circuit means and prevent polarity reversal in response to common mode noise picked up by said driven line pair.

11. The system of claim 5 wherein said coupling means comprise capacitor means connected between one of said inputs and one of said control lines, and voltage divider means connected for keeping said one input at a first voltage relative to system ground and the other input at a second smaller voltage relative to ground, such that a sudden drop in the voltage difference between the two control lines in excess of the difference between said first and second voltages reverses the relative polarities of said amplifier inputs, thereby reversing the polarities of said control lines.

12. The control system of claim 8 further comprising means for selecting a preferred power-up polarity state for said reflex module, said means comprising reactive means coupling said operational amplifier inputs to one or the other voltage supply rails of said reflex circuit, such that a pulse of polarity equal to said one or other supply rails is coupled to the inputs of said operational amplifier when power is first connected to said operational amplifier means to cause the operational amplifier output to assume a particular initial polarity state.

13. The control system of claim 12 further comprising switch means for selectively connecting said reactive coupling means to one or another of the supply rails to said operational amplifier means.

14. The control system of claim 8 further comprising an interface for controlling the polarity of said reflex circuit comprising switch means responsive to logic level input signals and reactive coupling means selectively connectable between the inputs to said operational amplifier and one or the other of the supply rails to said operational amplifier through said logic controlled switch means.

15. The control system of claim 14 further comprising monitoring means connected to said reflex circuit for deriving a logic level signal indicative of the polarity of said reflex circuit.

16. The control system of claim 14 wherein said switch means comprise first and second optically coupled switches connected between the positive and negative supply rails of the operational amplifier means, respectively, and the inputs to said operational amplifier means, said first or second optically coupled switches being selectably actuatable by logic level input signals to each said switch.

17. The system of claim 1 further comprising one or more command modules connected between said pair of lines, each command module comprising;
control switch means connected between said pair of lines actuatable by an operator for causing a sudden momentary drop in the voltage difference between said pair of lines;
rectifier means connected for supplying power from said line pair to the inputs of a relay only in a particular relative polarity state of said line pair; and
current regulator means for limiting the current supplied to said relay inputs.

18. The system of claim 17 wherein each said command module further comprises visual indicator means connected to said rectifier means for indicating whether the polarity state of the line pair corresponds to an ON condition of the command module in which power is delivered to the inputs of a relay or to an OFF condition in which no power is delivered to the relay inputs.

19. The system of claim 17 wherein said control switch means is a normally open momentary contact single pole double throw switch having two terminals, each terminal being connected to one line of said line pair, and a movable contact;
said current regulator means is connected between said movable contact and a first relay drive line;
a second relay drive line is connected to one of the lines of said line pair and wherein said rectifier means include at least one rectifier element connected between said movable contact and each said terminal for connecting together said pair of lines through a low impedance path when said control switch is actuated for connecting the movable contact to only one of said two terminals for a given polarity state of said line pair, and only to the other of said two terminals for the opposite polarity state of said line pair.

20. The system of claim 19 wherein said rectifier means comprise a first light emitting diode connected in series with said second relay drive line, a second light emitting diode connected in parallel with said current regulator means between one of said switch terminals and said first relay drive line, and Zener diode means connected between said first and second relay drive lines such that one of said light emitting diodes will illuminate depending on the polarity state of said line pair.

21. The system of claim 17 wherein each said command module comprises local override means switchable between a first condition in which said rectifier means deliver power to said relay inputs regardless of the relative polarity of said line pair and a second condition in which no power is delivered to said relay inputs regardless of the relative polarity of said line pair.

22. The control system of claim 1 further comprising one or more extender circuits each extender circuit having a pair of inputs connected to said control line pair and a pair of outputs, means for delivering electrical power of a first or second relative polarity to said outputs, first means for momentarily establishing a low impedance path between said inputs in response to a drop in the voltage difference between said outputs for causing a drop in the voltage difference between said pair of control lines connected to said inputs and thereby stimulate a reversal of the relative polarity of said control line pair, and second means responsive to a reversal in the relative polarities of said control lines connected to said inputs for reversing the relative polarities of said extender circuit outputs.

23. The system of claim 22 further comprising a second pair of control lines connected to said extender circuit outputs and command means actuatable for momentarily establishing a low impedance path between said second control line pair to thereby reverse the polarity of both said extender circuit outputs and the control line pair connected between said reflex circuit and the extender circuit inputs.

24. A reflex circuit comprising amplifier means connected to positive and negative voltage supply rails, an inverting input, a noninverting input and an output voltage of a given polarity referenced to system ground, and means connected between said output and said inputs for reversing the polarity of said output relative to system ground in response to a momentary drop in the voltage difference between said output and system ground.

25. The reflex circuit of claim 24 wherein said means connected between said output and said inputs comprise coupling means for coupling a drop in the voltage difference between said control lines to said inputs to thereby momentarily reverse the relative polarity of said inputs, and feedback means for maintaining said inputs in a state of reversed polarity following said voltage drop.

26. The reflex circuit of claim 25 wherein said coupling means are capacitive coupling means.

27. The reflex circuit of claim 25 wherein said coupling means are selected such that only a relatively fast voltage drop is coupled for reversing polarity of said amplifier inputs.

28. The reflex circuit of claim 25 wherein said amplifier means comprise operational amplifier means having an operational amplifier output, said inverting and noninverting inputs being connected to said operational amplifier means, power amplifier means having an output for driving said control line pair, said power amplifier being driven by said operational amplifier output so that the power amplifier output follows the polarity of said operational amplifier output, said coupling means being connected between said power amplifier output and said operational amplifier inputs, and said feedback means are connected between said operational amplifier output and said inputs.

29. The reflex circuit of claim 28 wherein said power amplifier means are push-pull balanced symmetry amplifier means.

30. The reflex circuit of claim 28 wherein said power amplifier means include current limiter means for limiting the current delivered to a control line pair.

31. A power control system comprising
amplifier means connected to positive and negative voltage supply rails, an inverting input, a noninverting input and an output voltage of a given polarity referenced to system ground, and means connected between said output and said input for reversing the polarity of said output relative to system ground in response to a momentary drop in the voltage difference between said output and system ground;
a pair of electrically conductive control lines, one of said lines being connected to said amplifier output and the other of said lines being referenced to ground; and
command means actuatable for causing a momentary drop in the voltage difference between said control lines to thereby obtain reversal of the relative polarity of said control lines.

32. The power control system of claim 31 further comprising relay means responsive to relative polarity reversal of said control lines for switching power to a load.

33. The power control system of claim 31 further comprising monitoring means connected for indicating the relative polarity state of said pair of lines.

34. A control system comprising circuit means including a pair of extended electrical conductors, said circuit means capable of supplying sufficient power for driving one or more relays connected between said conductors remotely of said circuit means, said circuit means maintaining said conductor pair in one of a plurality of relative electrical states, switch means connected between said pair of conductors remotely of said circuit means and actuatable for applying a momentary stimulus to said conductor pair said circuit means changing the relative electrical state of said conductor pair in response to a momentary stimulus applied to said conductor pair and maintaining said changed relative state following removal of said stimulus, said circuit means again changing the relative electrical state of said conductor pair upon subsequent actuation of said switch means such that relay means powered only by said conductor pair and sensitive to such a change in the electrical state of said control lines may be switched between an ON condition and an OFF condition.

35. The control system of claim 34 wherein the electrical state changed by said reflex circuit is the relative polarity of said control lines.

36. The control system of claim 34 further comprising an extender circuit having a pair of inputs connected to said control lines and a pair of outputs, means for maintaining said outputs in a first relative electrical state, first means for applying a momentary stimulus to said control lines responsive to a momentary stimulus applied to said outputs to thereby stimulate a change in the electrical state of said control lines, and second means for changing the electrical state of said extender outputs responsive to a change in the electrical state of said control line pair connected to said extender inputs.

37. The system of claim 36 further comprising a plurality of said extender circuits connected in series by said control line pair, said outputs of each extender circuit being connected to said inputs of the subsequent extender circuit such that a momentary stimulus applied to said control line pair at any point between any two of said series connected extender circuits induces a change in the electrical state of said control line pair along the entire series connected chain.

38. The control system of claim 35 further comprising an extender circuit having a pair of inputs connected to said control lines and a pair of outputs, means for delivering electrical power of a first or a second relative polarity to said outputs, first means for reversing the relative polarity of said outputs in response to a momentary change in the impedance between said pair of outputs, and second means for momentarily changing the impedance between said inputs responsive to a momentary change in the impedance between said outputs to thereby stimulate a change in the relative polarity of said control lines, and third means for reversing the relative polarity of said extender outputs responsive to a reversal of the relative polarity of said control lines connected to said extender inputs.

39. A circuit having a pair of extender inputs and a pair of extender outputs, means for maintaining said outputs in a first relative electrical state, first means for changing the relative electrical state of said outputs in response to a momentary change in the impedance between said pair of outputs, second means for momentarily changing the impedance between said inputs responsive to such momentary change in the impedance between said outputs, and third means for changing the relative electrical state of said extender outputs responsive to a change in the electrical state of a pair of control lines connected to said extender inputs, said outputs remaining in said changed state until either a momentary low impedance path is again established between said extender outputs or the electrical sate of said control line pair is again changed, whereupon said first means return said outputs to said first relative electrical state.

40. A circuit having a pair of inputs and a pair of outputs, means for delivering an electrical voltage of a first or a second relative polarity to said outputs, means for momentarily reversing the relative polarity of said outputs in response to a momentary drop in the voltage difference between said pair of outputs induced by a momentary low impedance path established between said pair of outputs, means for momentarily establishing a low impedance path between said inputs responsive to such momentary change in the impedance between said outputs, and means for stably reversing the relative polarity of said outputs in response to a reversal of the relative polarities of a conductor pair connected to said inputs.

41. A control system comprising circuit means including a single pair of electrical conductors, a plurality of switches connected between said conductor pair, and one or more relays having relay control inputs connected to said conductor pair, said circuit means being responsive to actuation of any one of said switches for reversibly switching said relays back and forth between an OFF state and an ON state with each actuation of any one of said switches including repeated actuation of the same one of said switches, whereby said one or more relays may be controlled from any one of said switches disposed at geographically spaced locations with only a single conductor pair interconnecting both said switches and said relay control inputs.

42. The control system of claim 41 wherein neither said switches nor said relay control inputs draw electrical power from a source other than said conductor pair.

43. The control system of claim 41 wherein said control switches are momentary contact normally open switches.

44. A control system comprising reflex circuit means, a single pair of electrical conductors of arbitrary length connected to said reflex circuit means and maintained in one of two relative electrical states by said reflex circuit means, a plurality of control switches connected at arbitrarily spaced intervals to said single pair, said reflex circuit means changing said electrical state of said single pair in response to actuation of any one of said control switches, and one or more relays having relay control inputs connected at arbitrary points to said single pair, said one or more relays being reversibly switchable between an OFF state and an ON state, said one or more relays being switchable from one of said states to the other of said states in response to change of said single pair from one said electrical state to the other through actuation of any one of said control switches, said one or more relays being subsequently returnable from said other state to said one state by actuation of the same or any other of said control switches.

45. A control system comprising a single pair of electrical conductors of arbitrary length, one or more relays having relay control inputs connected at arbitrary points to said single pair, circuit means delivering a control voltage to said line pair for controlling the state of said relays, and a plurality of control switches connected only between said pair of electrical conuctors at arbitrarily spaced intervals along said single pair, said one or more relays being reversibly switchable from an OFF state to an ON state in response to actuation of any one of said control switches, said one or more relays being subsequently returnable from said ON state to said OFF state by actuation of the same or any other of said control switches, whereby said one or more relays may be controlled from any one of said switches disposed at geographically spaced locations with only a single line pair interconnecting both said switches and said relay control inputs and neithersaid control switches nor said relay control inputs requiring electrical power from a source other than said single pair.

46. A control system comprising circuit means connected to a single pair of electrical conductors, one or more normally open switches connected between the conductors of said conductor pair, and relay means having relay control inputs connected to said single pair, said reflex circuit means maintaining said relay means in a beginning ON state or OFF state, said reflex circuit means switching the state of said relay means to a changed state in response to momentary closure of any one of said control switches, said reflex circuit returning said relay means from said changed to said beginning state upon subsequent momentary closure of the same or any other of said control switches.

47. A control system comprising circuit means connected to a single pair of electrical conductors for maintaining a given beginning relative electrical state between said pair of conductors, said circuit means being responsive to the momentary actuation of any one of a plurality of geographically spaced switches connected between the conductors of said single pair by altering said relative electrical state, said circuit means returning said single pair to said beginning state upon subsequent momentary actuation of the same or any other of said switches.

48. The system of claim 47 further comprising one or more relay means having control inputs connected to said single pair such that the state of said relay is controlled by said relative electrical states of said single pair and said relays can be switched between an ON state and an OFF state by momentary actuation of any one of said switches.

49. The system of claim 47 further comprising indicator means connected for drawing electrical power only from said single pair for indicating the relative electrical state of said single pair of conductors.

50. The system of claim 47 wherein said switches are passive elements and may be distributed geographically without regard to the local availability of electrical power other than from said single pair.

51. A control system comprising reflex circuit means having a pair of output terminals for delivering an electrical voltage to a pair of electrical conductors of arbitrary length connected to said output terminals and normally presenting a high impedance load to said reflex circuit means, one or more normally open control switches connected between said pair of conductors and being actuatable for establishing a momentary low impedance path between said conductor pair, said reflex circuit means being responsive to said momentary low impedance path by reversing the relative polarity of said electrical voltage, back and forth with each actuation of the same or any other one of said one or more switches and at least one power relay means having control inputs connected to said conductor pair, said relay means being switchable between an ON condition and an OFF condition in response to polarity reversal of said electrical voltage, said control switches and said power control relay means being connected to said conductor pair at arbitrarily spaced apart points along the length of said conductor pair.

52. The system of claim 51 further comprising extender circuit means having a pair of extender inputs connected to said reflex circuit outputs by a first pair of electrical conductors for receiving a first electrical voltage of a given polarity, a pair of extender outputs connected for delivering a second electrical voltage to an extended conductor pair, said one or more control switches being connected across either or both of said first conductor pair and said extended conductor pair, said extender circuit means being responsive to establishment of a momentary low impedance path across said extended pair by also momentarily establishing a low impedance path across said extender inputs to thereby induce a polarity reversal of said first electrical voltage by said reflex circuit means, said extender circuit means being further responsive to polarity reversal of said first electrical voltage at said extender inputs by reversing the relative polarity of said second electrical voltage of said extender outputs, such that said power control relay means may be connected to either of said first or extended conductor pairs and be switchable responsive to actuation of said control switches connected to either the same or the other of said first or extended conductor pairs.

53. The system of claim 51 further comprising polarity indicator means connected to said conductor pair for indicating the relative polarity of said electrical voltage and powered only by the electrical voltage across said conductor pair.

54. The system of claim 51 wherein said power relay means are connected for switching power to one or more controlled loads, such that power to all such controlled loads can be controlled from any one of said control switches connected at any point along said conductor pair.

55. The system of claim 52 further comprising polarity indicator means connected to one or both of said first and extended conductor pairs for indicating the relative polarity of said first or second electrical voltage and powered only by the electrical voltage across said first or extended conductor pairs.

* * * * *